US 8,620,655 B2

(12) United States Patent
Xu et al.

(10) Patent No.: US 8,620,655 B2
(45) Date of Patent: Dec. 31, 2013

(54) SPEECH PROCESSING SYSTEM AND METHOD

(75) Inventors: Haitian Xu, Cambridge (GB); Kean Kheong Chin, Cambridge (GB); Mark John Francis Gales, Cambridge (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 147 days.

(21) Appl. No.: 13/206,872

(22) Filed: Aug. 10, 2011

(65) Prior Publication Data

US 2012/0041764 A1     Feb. 16, 2012

(30) Foreign Application Priority Data

Aug. 16, 2010 (GB) ................................ 1013730.5

(51) Int. Cl.
| | | |
|---|---|---|
| *G10L 15/14* | (2006.01) | |
| *G10L 15/00* | (2013.01) | |
| *G10L 15/20* | (2006.01) | |
| *G10L 15/28* | (2013.01) | |
| *G10L 15/04* | (2013.01) | |

(52) U.S. Cl.
USPC ........... 704/236; 704/256; 704/233; 704/242; 704/246; 704/238; 704/239; 704/240; 704/243; 704/247; 704/250; 704/251; 704/254; 704/255

(58) Field of Classification Search
USPC ......................................... 704/233, 254–256
See application file for complete search history.

(56) References Cited

U.S. PATENT DOCUMENTS

| | | | |
|---|---|---|---|
| 7,457,745 B2* | 11/2008 | Kadambe et al. ............. | 704/216 |
| 2004/0230420 A1 | 11/2004 | Kadambe et al. | |
| 2005/0149326 A1* | 7/2005 | Hogengout et al. .......... | 704/242 |
| 2010/0204988 A1* | 8/2010 | Xu et al. ....................... | 704/233 |

FOREIGN PATENT DOCUMENTS

| | | |
|---|---|---|
| EP | 0 831 461 A2 | 3/1998 |
| EP | 0 831 461 A3 | 3/1998 |
| GB | 2464093 A | 4/2010 |
| GB | 2471875 A | 1/2011 |
| JP | 10149191 A2 | 6/1998 |
| WO | WO 2005/036525 A1 | 4/2005 |
| WO | WO 2006/033044 A2 | 3/2006 |
| WO | WO 2006/033044 A3 | 3/2006 |
| WO | WO 2006033044 A2 * | 3/2006 |
| WO | WO 2010/035892 A1 | 4/2010 |

OTHER PUBLICATIONS

A. Acero, L. Deng, T. Kristjansson, and J. Zhang, "HMM adaptation using vector taylor series for noisy speech recogntion," in Proc.of ICSLP, Sep. 2000.*
M.J.F.Gales and R. van Dalen, "Predictive linear transforms for noise robust speech recognition," in Proc.of ASRU, Dec. 2007.*
H.Liao and M.J.F.Gales, "Adaptive training with joint uncertainty decoding for robust recognition of noisy data," in Proc. of ICASSP, 2007.*
T. Emori and K. Shinoda, "Rapid Vocal Tract Length Normalization using Maximum Likelihood Estimation," Eurospeech 2001.*
J. Li, L. Deng, D. Yu, Y. Gong, and A. Acero, "High-performance hmm adaptation with joint compensation of additive and convolutive distortions via vector taylor series," in Proc.of ASRU, Dec. 2007.*
M.J.F.Gales, "Maximum likelihood linear transformations for hmm based speech recognition," Computer Speech and Language, vol. 12, Jan. 1998.*
R. C. van Dalen, F. Flego, and M. J. F. Gales. Transforming features to compensate speech recogniser models for noise. In Proc. InterSpeech, 2009.*
Sankar et al., "A Maximum-Likelihood Approach to Stochastic Matching for Robust Speech Recognition".*
Lu et al., "Maximum Likelihood Model Adaptation Using Piecewise Linear Transformation for Robust Speech Recognition".*
Raghavan, "Speaker and Environment Adaptation in Continuous Speech Recognition".*
Kim et al., "Noisy CMLLR for Noise-Robust Speech Recognition".*

United Kingdom Search Report issued on Nov. 25, 2010 in corresponding United Kingdom Application No. 1013730.5.
Bin Ma et al., "Effects of Device Mismatch, Language Mismatch and Environmental Mismatch on Speaker Verification", IEEE International Conference on Acoustics, Speech and Signal Processing, ICASSP 2007, Apr. 15-20, 2007, 4 Pages.
Alex Acero et al., "HMM Adaptation Using Vector Taylor Series for Noisy Speech Recognition", 6th International Conference on Spoken Language Processing (ICSLP 2000), ISCA Archive, http://www.isca-speech.org/archive, Oct. 16-20, 2000, 4 Pages.
H. Liao et al., "Joint Uncertainty Decoding for Noise Robust Speech Recognition", Interspeech 2005, Sep. 4-8, 2005, pp. 3129-3132.
Haitian Xu et al., "Joint Uncertainty Decoding with the Second Order Approximation for Noise Robust Speech Recognition", IEEE International Conference on Acoustics, Speech and Signal Processing, ICASSP 2009, Apr. 19-24, 2009, pp. 3841-3844.
M. J. F. Gales et al., "Predictive Linear Transforms for Noise Robust Speech Recognition", IEEE International Workshop on Automatic Speech Recognition & Understanding, ASRU 2007, Dec. 9-13, 2007, pp. 59-64.
Haitian Xu et al., "Improving Joint Uncertainty Decoding Performance by Predictive Methods for Noise Robust Speech Recognition", IEEE International Workshop on Automatic Speech Recognition & Understanding, ASRU 2009, Nov. 13-Dec. 17, 2009, pp. 222-227.
Japanese Office Action issued Sep. 11, 2012 in Patent Application No. 2011-177854 with English Translation.
Hiroshi Shimodaira et al., "Jacobian Joint Adaptation to Noise, Channel and Vocal Tract Length", Proc. ICASSP2002, U.S., vol. 1, Mar. 2002, pp. I-197-I-200.

\* cited by examiner

*Primary Examiner* — Paras D Shah
*Assistant Examiner* — Anne Thomas-Homescu
(74) *Attorney, Agent, or Firm* — Oblon, Spivak, McClelland, Maier & Neustadt, L.L.P.

(57) ABSTRACT

A speech processing method, comprising:
   receiving a speech input which comprises a sequence of feature vectors;
   determining the likelihood of a sequence of words arising from the sequence of feature vectors using an acoustic model and a language model, comprising:
providing an acoustic model for performing speech recognition on an input signal which comprises a sequence of feature vectors, said model having a plurality of model parameters relating to the probability distribution of a word or part thereof being related to a feature vector, wherein said speech input is a mismatched speech input which is received from a speaker in an environment which is not matched to the speaker or environment under which the acoustic model was trained; and
adapting the acoustic model to the mismatched speech input,
the speech processing method further comprising determining the likelihood of a sequence of features occurring in a given language using a language model; and
combining the likelihoods determined by the acoustic model and the language model and outputting a sequence of words identified from said speech input signal,
wherein adapting the acoustic model to the mismatched speaker input comprises:
relating speech from the mismatched speaker input to the speech used to train the acoustic model using: a mismatch function f for primarily modelling differences between the environment of the speaker and the environment under which the acoustic model was trained; and a speaker transform F for primarily modelling differences between the speaker of the mismatched speaker input, such that:

$y=f(F(x,v),u)$ where y represents the speech from the mismatched speaker input, x is the speech used to train the acoustic model, u represents at least one parameter for modelling changes in the environment and v represents at least one parameter used for mapping differences between speakers; and
jointly estimating u and v.

11 Claims, 3 Drawing Sheets

SPEECH PROCESSING SYSTEM AND METHOD

CROSS REFERENCE TO RELATED APPLICATIONS

This application is based upon and claims the benefit of priority from UK Patent Application No. GB1013730.5, filed Aug. 16, 2010; the entire contents of which are incorporated herein by reference.

FIELD

Embodiments of the present invention described herein relate generally to speech processing.

BACKGROUND

Automatic speech recognition (ASR) systems have some level of pre-training where the system is taught to associate speech and words. The pre-training will be performed using speech from one or more speakers. Rarely, do the training conditions such as the speakers or the environment match the conditions under which the system is really used. Such speaker and environment mismatches between training and test degrade the ASR performance dramatically, making it difficult to deploy speech recognition technology in many applications.

It is possible to adapt a system to operate under different conditions by modelling a relationship between the training conditions and the "real-use" conditions. Such modelling has been achieved by compensating for the differences in the environments and separately compensating for the differences between the speech of the user and the speech used to pre-train the system.

BRIEF DESCRIPTION OF DRAWINGS

Embodiments of the present invention will now be described with reference to the following figures in which.

DETAILED DESCRIPTION

Current speech processing systems which can adapt from their training conditions to work under differing conditions model the differences between the training speech and the user's speech in one stage and then model the differences between the training environment and the use environment separately. Often there is only very limited adaptation data available.

However these techniques are normally not designed for taking both mismatches into account at the same time. Specifically, speaker adaptation techniques in literature often assume training and test environment noise free whereas noise compensation techniques often ignore speaker mismatches. Although methods for speaker adaptation can sometimes be used for compensating noise mismatch to some extent and vice versa, these techniques can not guarantee to work with their best capacity as the basic assumptions for them can not be satisfied when both mismatches exist. This is especially the case for speaker adaptation techniques as there is no observation for clean speech available during test when noise mismatch exists.

A noise mismatch function has been previously used which models the relationship between clean and noisy speech features given the value of additive and convolutional noise.

In an embodiment, the present invention provides a speech processing method, comprising:
receiving a speech input which comprises a sequence of feature vectors;
determining the likelihood of a sequence of words arising from the sequence of feature vectors using an acoustic model and a language model, comprising:
providing an acoustic model for performing speech recognition on an input signal which comprises a sequence of feature vectors, said model having a plurality of model parameters relating to the probability distribution of a word or part thereof being related to a feature vector, wherein said speech input is a mismatched speech input which is received from a speaker in an environment which is not matched to the speaker or environment under which the acoustic model was trained; and
adapting the acoustic model to the mismatched speech input,
the speech processing method further comprising determining the likelihood of a sequence of features occurring in a given language using a language model; and
combining the likelihoods determined by the acoustic model and the language model and outputting a sequence of words identified from said speech input signal,
wherein adapting the acoustic model to the mismatched speaker input comprises:
relating speech from the mismatched speaker input to the speech used to train the acoustic model using: a mismatch function f for primarily modelling differences between the environment of the speaker and the environment under which the acoustic model was trained; and a speaker transform F for primarily modelling differences between the speaker of the mismatched speaker input, such that:

$$y = f(F(x,v), u)$$

where y represents the speech from the mismatched speaker input, x is the speech used to train the acoustic model, u represents at least one parameter for modelling changes in the environment and v represents at least one parameter used for mapping differences between speakers; and
jointly estimating u and v.

In the above embodiment, speaker adaptation techniques are applied directly into an environment mismatch function. The new mismatch function then models both speaker and environment mismatches and therefore gives the capability to handle the two types of mismatches the same time without violating the basic assumptions.

The above framework allows speaker adaptation techniques to fit in easily with noise compensation techniques. In general, any factors that affect the acoustic properties of the speech signal received at the input of the speech recogniser can be classified into either speaker mismatches or environment mismatches.

The term speaker mismatches is used to refer to differences in factors, such as: accent; 2. speaking style; 3. emotion (e.g., angry vs calm, and other state of mind of the speaker); 4. speaker physical properties, such as: blocked nose, cigarette on the lips, gender, vocal track length and so on; 5. Lombard effect (speaker influence by noise); 6. speaker is distracted by other things; or 7. dis-fluency. However, other types of speaker mismatches are possible and the above list is not exhaustive.

In a further embodiment, said at least one parameter u comprises parameters n and h, where n is used to model additive noise and h is used to model convolutional noise. However, the mismatch function f could also be used to compensate for other changes in environment such as: background noises from various sources; 2. speech from background speakers; 3. reverberant properties; or 4. recording device properties, including microphone and other effect or distortion introduced by electronic or digital recording devices, or other channel effect/properties.

In one embodiment, said mismatch function f is of the form:

$$y_s = q(x_s, n_s, h_s) \quad (2)$$

$$= F(x_s) + h_s + C\ln(1 + e^{C^{-1}(n_s - F(x_s) - h_s)})$$

However, other forms of mismatch are possible, for example:

$$y_s = x_s + hs + \frac{1}{\gamma}C\ln(1 + e^{\gamma C^{-1}(n_s - x_s - h_s)})$$

This is a more generic form of mismatch function (2). Different values for $\gamma$ are for different assumptions whether speech and noise are additive in the power, magnitude or other domains. When $\gamma=1$, it is for magnitude domain and consistent with the original mismatch function. When it is 2, it is for power domain.

$$y_s = x_s + h_s + 2C\ln(1 + e^{0.5C^{-1}(n_s - x_s - h_s)}) + 2\alpha e^{C^{-1}(n_s - x_s - h_s)}$$

where $\alpha$ is a constant. Compared to the mismatch function of equation (2), this mismatch function further models the random phase relationship between clean speech and noise. (mismatch function of equation (2) assumes they are statistically orthogonal and therefore ignores the phrase relationship.)

In both of the above alternative forms of the mismatch function or for that matter any form of the mismatch function F(x), could be substituted for x.

In an embodiment, Vector Taylor Series (VTS) is used for environment compensation.

In one embodiment, said speaker transform is a linear transform. In a further embodiment, speaker transform is a vocal tract length normalisation (VTLN) transform.

Thus, VTLN can be combined into a VTS framework as above to form VTLN based VTS (VVTS).

In a further embodiment, VVTS is applied to a predictive constrained maximum likelihood regression (PCMLLR). In PCMLLR, the CMLLR form:

$$p(y|m) = |A_c^{(r)}|N(A_c^{(r)}y + b_c^{(r)}; \mu_x^{(m)}, \Sigma_x^{(m)}) \quad (19)$$

is used and $A_c^{(r)}$ and $b_c^{(r)}$ (which are CMLLR transforms) are estimated using PCMLLR techniques which minimises the divergence between equation (19) and a target distribution.

In an embodiment, adaptive training is used. Adaptive training, as all training algorithms, optimises training criteria. In one embodiment a discriminative criteria such as minimum phone error (MPE) is used. Maximum likelihood criteria may also be used.

In an embodiment, at least one speaker transform parameter is a discrete parameter.

In a further embodiment, said joint estimation of u and v is performed using the expectation maximisation algorithm.

In an embodiment, the present invention is used in a system where there is a training mode for said new speaker and said new speaker reads known text. The speech data and the text which is read can then be used to estimate the transforms to adapt the acoustic model to the new speaker.

In a further embodiment, speech data is received for which text is not known. For example, if the system is used as part of a voice controlled sat nav system, an MP3 player, smart phone etc, there is generally no distinct adaptation training phase. In such systems, text corresponding to the input speech will be estimated on the basis of a hypothesis. For example, the text may first be estimated using the model without adaptation. The system then uses this hypothesis to estimate the transforms. The transforms may then be continually estimated and adapted as more speech is received.

The above two embodiments may be combined such that a system with an adaptation training phase also continually updates transforms after said adaptation training phase has been completed and when said system is in use.

In a yet further embodiment, the present invention provides a method of adapting an acoustic model for speech processing to a mismatched speech input, said mismatched speech input being received from a speaker in an environment which is not matched to the speaker or environment under which the acoustic model was trained, the method comprising:
  receiving a mismatched speech input which comprises a sequence of feature vectors; and
  providing an acoustic model for performing speech processing on an input signal which comprises a sequence of feature vectors, said model having a plurality of model parameters relating to the probability distribution of a word or part thereof being related to a feature vector,
  wherein adapting the acoustic model to the mismatched speaker input comprises:
  relating speech from mismatched speaker input to the speech used to train the acoustic model using: a mismatch function f for primarily modelling differences between the environment of the speaker and the environment under which the acoustic model was trained; and a speaker transform F for primarily modelling differences between the speaker of the mismatched speaker input, such that:

$$y = f(F(x,v),u)$$

where y represents the speech from the mismatched speaker input, x is the speech used to train the acoustic model, u represents at least one parameter for modelling changes in the environment and v represents at least one parameter used for mapping differences between speakers; and
  jointly estimating u and v.

Embodiments of the present invention can be implemented either in hardware or on software in a general purpose computer. Further embodiments of the present invention can be implemented in a combination of hardware and software.

Embodiments of the present invention can also be implemented by a single processing apparatus or a distributed network of processing apparatuses.

Since embodiments of the present invention can be implemented by software, the present invention encompasses computer code provided to a general purpose computer on any suitable carrier medium. The carrier medium can comprise any storage medium such as a floppy disk, a CD ROM, a magnetic device or a programmable memory device, or any transient medium such as any signal e.g. an electrical, optical or microwave signal.

Figure 1:
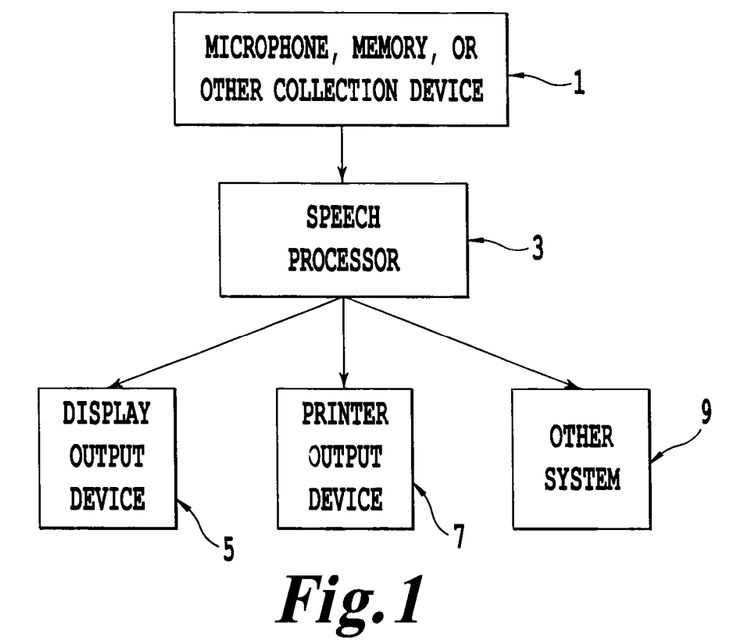
FIG. 1 is a schematic of a general speech processing system.

FIG. 1 is a schematic of a very basic speech recognition system. A user (not shown) speaks into microphone 1 or other collection device for an audio system. The device 1 could be substituted by a memory which contains audio data previously recorded or the device 1 may be a network connection for receiving audio data from a remote location.

The speech signal is then directed into a speech processor 3 which will be described in more detail with reference to FIG. 2.

The speech processor 3 takes the speech signal and turns it into text corresponding to the speech signal. Many different forms of output are available. For example, the output may be in the form of a display 5 which outputs to a screen. Alternatively, the output could be directed to a printer or the like. Also, the output could be in the form of an electronic signal which is provided to a further system 9. For example, the further system 9 could be part of a speech translation system which takes the outputted text from processor 3 and then converts it into a different language. The converted text is then outputted via a further text to speech system.

Alternatively, the text outputted by the processor 3 could be used to operate different types of equipment, for example, it could be part of a mobile phone, car, etc. where the user controls various functions via speech. The output could be used in an in-car navigation system to direct the user to a named location.

Figure 2:
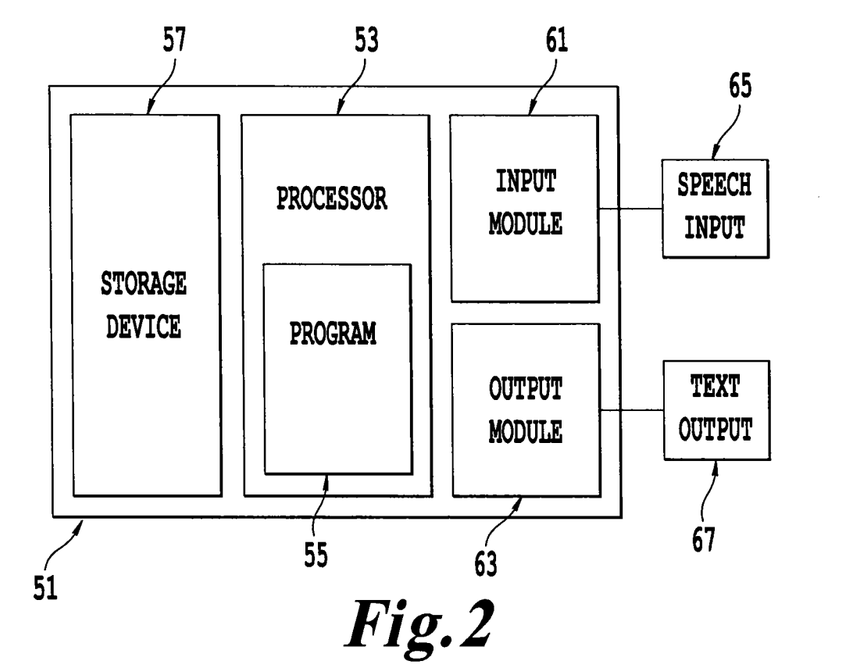
FIG. 2 is a schematic of the architecture of a processor configured for speech processing.

FIG. 2 shows the basic architecture of a speech processing system 51. The speech processing system 51 comprises a processor 53 which executes a program 55. Speech processing system 51 further comprises storage 57. The storage 57 stores data which is used by program 55 to convert speech to text. The speech processing system 51 further comprises an input module 61 and an output module 63. The input module 61 is connected to a speech input 65. Speech input 65 receives speech. The speech input 65 may be for example a microphone. Alternatively, speech input 65 may be a device for receiving speech data from an external storage medium or a network.

Connected to the output module 63 is output for text 67. The text output 67 is used for outputting a text signal converted from speech input into speech input 63. The text output 67 may be for example a direct text output e.g. a screen or a data file which may be sent to a storage medium, networked etc.

In use, the speech processing system 51 receives speech through speech input 65. The program 55 executed on processor 53 coverts the speech into text data using data stored in the storage 57. The text is output via the output module 63 to text output 67.

Figure 3:
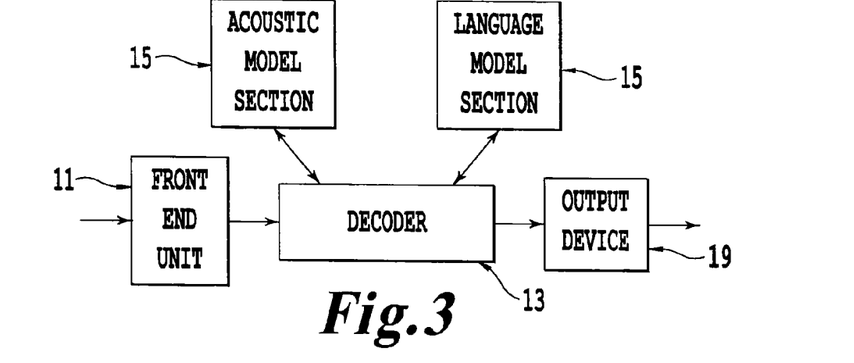
FIG. 3 is a schematic of the components of a speech recognition processor.

FIG. 3 is a block diagram of the standard components of a speech recognition processor 3 of the type shown in FIG. 1. The speech signal received from a microphone, through a network or from a recording medium 1, is directed into front-end unit 11.

The front end unit 11 digitises the received speech signal and splits it into frames of equal lengths. The speech signals are then subjected to a spectral analysis to determine various parameters which are plotted in an "acoustic space" or feature space. The parameters which are derived will be discussed in more detail later.

The front end unit 11 also removes signals, which are believed not to be speech signals, and other irrelevant information. Popular front end units comprise an apparatus that uses filter bank (F BANK) parameters, Mel Frequency Cepstral Coefficients (MFCC), and Perceptual Linear Predictive (PLP) parameters. The output of the front end unit is in the form of an input vector, which is in n-dimensional acoustic space.

The input vector is then fed into a decoder 13 which cooperates with both an acoustic model section 15 and a language model section 17. The acoustic model section 15 will generally operate using Hidden Markov Models. However, it is also possible to use acoustic models based on connectionist models and hybrid models.

The acoustic model unit 15 derives the likelihood of a sequence of observations corresponding to a word or part thereof on the basis of the acoustic input alone.

The language model section 17 contains information concerning probabilities of a certain sequence of words or parts of words following each other in a given language. Generally a static model is used. The most popular method is the N-gram model.

The decoder 13 then traditionally uses a dynamic programming (DP) approach to find the best transcription for a given speech utterance using the results from the acoustic model 15 and the language model 17.

This is then output via the output device 19 which allows the text to be displayed, presented or converted for further use e.g. in speech to speech translation or to control a voice activated device.

This description will be mainly concerned with the use of an acoustic model which is a Hidden Markov Model (HMM). However, it could also be used for other models.

The actual model used in this embodiment is a standard model, the details of which are outside the scope of this patent application. However, the model will require the provision of probability density functions (pdfs) which relate to the probability of an observation represented by an acoustic vector (speech vector or feature vector) being related to a word or part thereof. Generally, this probability distribution will be a Gaussian distribution in n-dimensional space.

Figure 4:
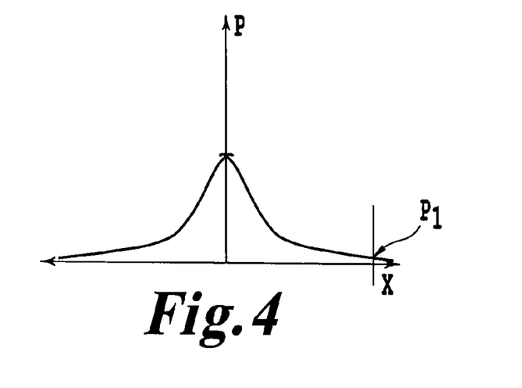
FIG. 4 is a schematic of a Gaussian probability function.

A schematic example of a generic Gaussian distribution is shown in FIG. 4. Here, the horizontal axis corresponds to a parameter of the input vector in one dimension and the probability distribution is for a particular word or part thereof relating to the observation. For example, in FIG. 4, an observation corresponding to an acoustic vector x has a probability p1 of corresponding to the word whose probability distribution is shown in FIG. 3. The shape and position of the Gaussian is defined by its mean and variance. These parameters are determined during training for phonemes or phonetic units which the acoustic model covers, they will be referred to as the "model parameters".

In a HMM, once the model parameters have been determined, the model can be used to determine the likelihood of a sequence of observations corresponding to a sequence of words or parts of words.

Figure 5:
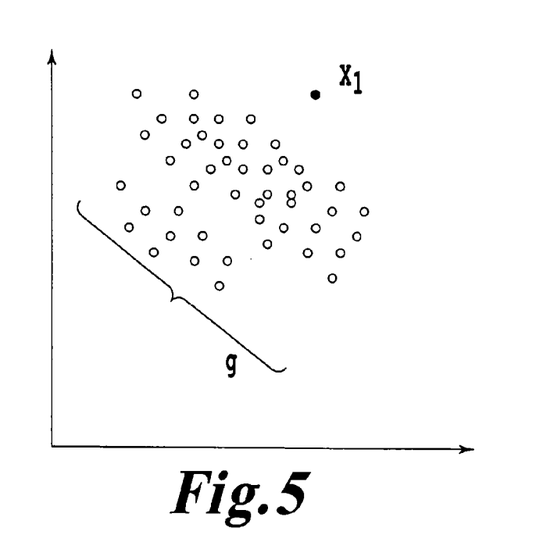
FIG. 5 is a schematic plot of acoustic space representing both probability density functions and an observation vector.

FIG. 5 is schematic plot of acoustic space where an observation is represented by an observation vector or feature vector $x_1$. The open circles g correspond to the means of Gaussians or other probability distribution functions plotted in acoustic space.

During decoding, the acoustic model will calculate a number of different likelihoods that the feature vector $x_1$ corresponds to a word or part thereof represented by the Gaussians. These likelihoods are then used in the acoustic model and combined with probabilities from the language model to determine the text spoken.

However, the acoustic model which is to be used for speech recognition will need to cope under different conditions such as for different speakers and/or in different environments.

Previously, mismatch functions have been derived for modelling the relationship between different environments. One example of such a mismatch function is:

$$y_s = f(x_s, n_s, h_s) = x_s + h_s + C \ln(1 + e^{C^{-1}(n_s - x_s - h_s)}) \quad (1)$$

where and y denote the cepstral feature for clean and noisy speech, respectively, n and h are additive and convolutional noise, C the discrete cosine transformation (DCT) matrix and the subscription s denotes static part. Eq. (1) has been widely used as noise mismatch function and is the foundation for most of the noise compensation techniques in the literature. Clearly it assumes no speaker mismatch between $y_s$ and $x_s$.

When there exists speaker mismatch, e.g. $x_s$ is in the speaker-independent clean feature space (i.e. HMM training space) and $y_s$ from one specific test speaker recorded in noisy environment, keeping using this mismatch function can not model the relationship between x and $y_s$ correctly and therefore compromises the performance.

Assuming there exists a function $z = F(x)$ to map speaker independent feature $x_s$ to speaker dependent feature $z_s$, $z_s$ and $y_s$ then only have environment mismatch and their relationship can be correctly modelled by Eq. (1). Thus, $$y_s = q(x_s, n_s, h_s) \quad (2)$$
$$= F(x_s) + h_s + C\ln(1 + e^{C^{-1}(n_s - F(x_s) - h_s)})$$

Compared to Eq. (1), using Eq. (2) as mismatch function has many advantages. First, it forms a more correct mismatch function between $x_s$ and $y_s$ which includes both speaker and environment mismatches. Second, F only models speaker mismatches in clean feature space and thus many speaker adaptation techniques in the literature can be applied for it without violating their basic assumptions. Third, using one mismatch function to include both mismatches makes it possible to jointly estimate the parameters for speaker adaptation and noise compensation in one step. This will give more efficient estimation and yield better performance than estimating them in separate steps. Finally, as many model based noise compensation techniques like Vector Taylor Series (VTS) are derived directly from mismatch function, they can be easily adapted to find solution based on the new enhanced mismatch function.

As far as the form of function F is concerned, there are many choices. One of the simplest is to use a linear function:

$$z = F(x) = A^{(r)-1}(x - b^{(r)}) \quad (3)$$

where r is the index of the regression class. In this case, A(r) can be continuous or discrete. When it is continuous, it virtually becomes CMLLR for speaker adaptation. When it is discrete the bias term b(r) can be ignored, i.e.

$$z = F(x) = A^{(r)-1}x \quad (4)$$

Vocal tract length normalisation (VTLN) is a transform for modelling speaker differences. As Vocal VTLN can be used as a linear transform on feature vectors, VTLN can be used as $A^{(r)-1}$ in Eq. (4). For rapid adaptation where adaptation data is limited, Eq. (4) is more advantageous than Eq. (19) as VTLN transforms have considerably fewer number of free parameters to estimate.

As a powerful noise compensation technique, model based Vector Taylor Series (VTS) compensates HMM parameters directly. The enhanced mismatch function above can be used with VTS.

VTS starts from the mismatch function in Eq. (1) and applies first order Taylor expansion to achieve linearisation. Assuming the $m^{th}$ mixture in the HMM has a Gaussian distribution with mean $\mu_x^{(m)}$ and variance $\Sigma_x^{(m)}$ $$P(x|m) = N(x; \mu_x^{(m)}, \Sigma_x^{(m)}) \quad (5)$$

then by performing the first order Taylor expansion on the expansion point $\zeta = (\mu_{xs}^{(m)}, \mu_{ns}, \mu_{hs})$ the mismatch function can be linearised as $$y = f(\zeta) + \frac{\partial f}{\partial x}\bigg|_\zeta (x - \mu_x^{(m)}) + \frac{\partial f}{\partial n}\bigg|_\zeta (n - \mu_n) \quad (6)$$

where $\mu_{ns}$ and $\mu_{hs}$ are static part of the additive and convolutional noise mean. Therefore the distribution of noisy speech is also Gaussian $$P(y|m) = N(y; \mu_y^{(m)}, \Sigma_y^{(m)}) \quad (7)$$

$$\mu_{ys}^{(m)} = f(\zeta) \quad (8)$$

$$\Sigma_{ys}^{(m)} = \text{diag}\left(\frac{\partial f}{\partial x}\bigg|_\zeta \Sigma_{xs}^{(m)} \frac{\partial f}{\partial x}\bigg|_\zeta^T + \frac{\partial f}{\partial n}\bigg|_\zeta \Sigma_{ns} \frac{\partial f}{\partial n}\bigg|_\zeta^T\right) \quad (9)$$

where $\Sigma_{ns}$ is the covariance of additive noise and diag(.) is an operator for diagonalising a square matrix. The distribution for delta and delta-delta parts of y can be also derived easily based on the static part by using continuous time approximation.

Eq. (8) and (9) are directly used for HMM compensation in VTS and the parameters for compensation is obtained by finding the best noise parameters $\Lambda_n = (\mu_{ns}, \mu_{hs}, \Sigma_n)$ to maximise the likelihood in Eq. (7) on adaptation data. This is normally achieved by the expectation-maximisation (EM) algorithm which optimises the auxiliary function:

$$\hat{\Lambda}_n = \underset{\hat{\Lambda}_n}{\text{argmax}}\, Q(\hat{\Lambda}_n, \Lambda_n) \quad (10)$$
$$= \underset{\hat{\Lambda}_n}{\text{argmax}}\, E\{\ln P(y, x, s | \hat{\Lambda}_n, y) | \Lambda_n, y\}$$

where s is the state sequence for the adaptation data, $\hat{\Lambda}_n$ and $\Lambda_n$ are noise parameters to be estimated and those from the last EM iteration, respectively. To solve Eq. (10), point estimation is required by fixing the Taylor expansion point, i.e. using noise parameters in $\Lambda_n$ as initial expansion point and switching the point to the newly estimated noise later when possible:

$$\mu_{ys}^{(m)} = f(\zeta) + \frac{\partial f}{\partial h}\bigg|_\zeta (\hat{\mu}_{hs} - \mu_{hs}) + \frac{\partial f}{\partial n}\bigg|_\zeta (\hat{\mu}_{ns} - \mu_{ns}) \quad (11)$$

Following Eq. (11), closed-form solution for noise mean $\mu_{ns}$ and $\mu_{hs}$ can be acquired. Then numerical methods e.g. Newton's method are adopted for estimating noise variance $\Sigma_n$.

When the enhanced mismatch of Eq. (2) is applied for VTS, the HMM can still be compensated with Eq. (8) and (9) by replacing f with q. When F(x) is linear, $$\frac{\partial q}{\partial h}\bigg|_\zeta = C \frac{1}{1+e^{C^{-1}(\mu_{ns} - A^{(r)-1}(\mu_{xs}^{(m)} - b^{(r)}) - \mu_{hs})}} C^{-1} \quad (12)$$

$$\frac{\partial q}{\partial x}\bigg|_\zeta = \left(\frac{\partial q}{\partial F(x)} \frac{dF(x)}{dx}\right)\bigg|_\zeta = \frac{\partial q}{\partial h}\bigg|_\zeta A^{(r)-1} \quad (13)$$

$$\frac{\partial q}{\partial n}\bigg|_\zeta = I - \frac{\partial q}{\partial h}\bigg|_\zeta \quad (14)$$

Apart from noise parameters, a method in accordance with embodiments of the present invention also requires estimation of speaker adaptation parameters, i.e. $\Lambda_{ns}=(\mu_{ns},\mu_{hs},\Sigma_n,A^{(r)},b^{(r)})$. The optimisation can be achieved by maximising the objective function in Eq. (10) which makes all the parameters jointly optimised in one M-step of the EM algorithm. Thus, this method in accordance with an embodiment of the present invention provides better efficiency and yields better likelihoods than optimising noise and speaker adaptation parameters in separate EM steps.

If $(A^{(r)}, b^{(r)})$ are continuous as in Eq. (19), the optimisation procedure is the same as VTS except that the Taylor expansion in Eq. (11) also contains extra parts for $A^{(r)}$ and $b^{(r)}$:

$$\mu_{ys}^{(m)} = q(\zeta) + \frac{\partial q}{\partial h}\bigg|_\zeta (\hat{\mu}_{hs} - \mu_{hs}) + \frac{\partial q}{\partial n}\bigg|_\zeta \quad (15)$$

$$(\hat{\mu}_{ns} - \mu_{ns}) + \sum_{i,j} \frac{\partial q}{\partial a_{ij}^{(r)}}\bigg|_\zeta (\hat{a}_{ij}^{(r)} - a_{ij}^{(r)}) + \sum_i \frac{\partial q}{\partial b_i^{(r)}}\bigg|_\zeta (\hat{b}_i^{(r)} - b_i^{(r)})$$

where $a_{ij}^{(r)}$ is the element in the ith row and jth column of $A^{(r)}$ and $b_i^{(r)}$ the ith element of $b^{(r)}$.

Compared to the continuous case, using the discrete transforms in Eq. (4) makes the solution much simpler and more straightforward. A solution can be found by using a brute force search. Specifically, given each $A^{(r)}$, Eq. (10) is optimised to find the best noise parameters $\Lambda_n$. Then the best $A^{(r)}$ and $\Lambda_n$ are selected for the best likelihood. This process can be presented as:

$$\hat{\Lambda} = \underset{\hat{A}^{(r)}}{\text{argmax}} \left\{ \underset{\hat{\Lambda}_n}{\max} Q(\hat{\Lambda}_n, \Lambda_n | \hat{A}^{(r)}) \right\} \quad (16)$$

This above description has described in detail the use of VTLN which provides a discrete transform. However, other transforms for F(x) both discrete and continuous may be used.

In a method in accordance with a further embodiment, a further framework is used to improve the efficiency of the above VTS based system.

Model based VTS is powerful but requires both Taylor expansion and model compensation on each HMM component. This takes considerable computing power when using a large HMM. The same is also true for the above described VVTS.

To further improve the performance of VVTS, it is reasonable to apply VVTS to PCMLLR framework. Given the estimated noise and VTLN parameters, VVTS based PCMLLR compensates HMM by performing Taylor expansion on regression class level, i.e. using $\zeta_r=(\mu_{xs}^{(r)},\mu_{ns},\mu_{hs})$ as expansion point where $\mu_{xs}^{(r)}$ is the static clean speech mean on the regression class r. Thus, $$\mu_{ys}^{(m)} = q(\zeta_r) + \frac{\partial q}{\partial x}\bigg|_{\zeta_r} (\mu_{xs}^{(m)} - \mu_{xs}^{(r)}) \quad (17)$$

$$\Sigma_{ys}^{(m)} = \text{diag}\left(\frac{\partial q}{\partial x}\bigg|_{\zeta_r} \sum_{xs}^{(m)} \frac{\partial q}{\partial x}\bigg|_{\zeta_r}^T + \frac{\partial q}{\partial n}\bigg|_{\zeta_r} \sum_{ns} \frac{\partial q}{\partial n}\bigg|_{\zeta_r}^T\right) \quad (18)$$

Then the final model compensation was conducted by using the CMLLR form $$p(y|m) = |A_c^{(r)}| N(A_c^{(r)}y + b_c^{(r)}; \mu_x^{(m)}, \Sigma_x^{(m)}) \quad (19)$$

where $A_c^{(r)}$ and $b_c^{(r)}$ are CMLLR transforms estimated by PCMLLR which minimises the Kullback-Leibler divergence between Eq. (19) and the regression-class based VVTS compensation in Eq. (17) and (18).

The method of the present embodiment can also be used in an adaptive training framework such as PCMLLR adaptive training (PAT). It is possible to use a discriminative criteria such a minimum phone error (MPE) in such a framework.

Figure 6:
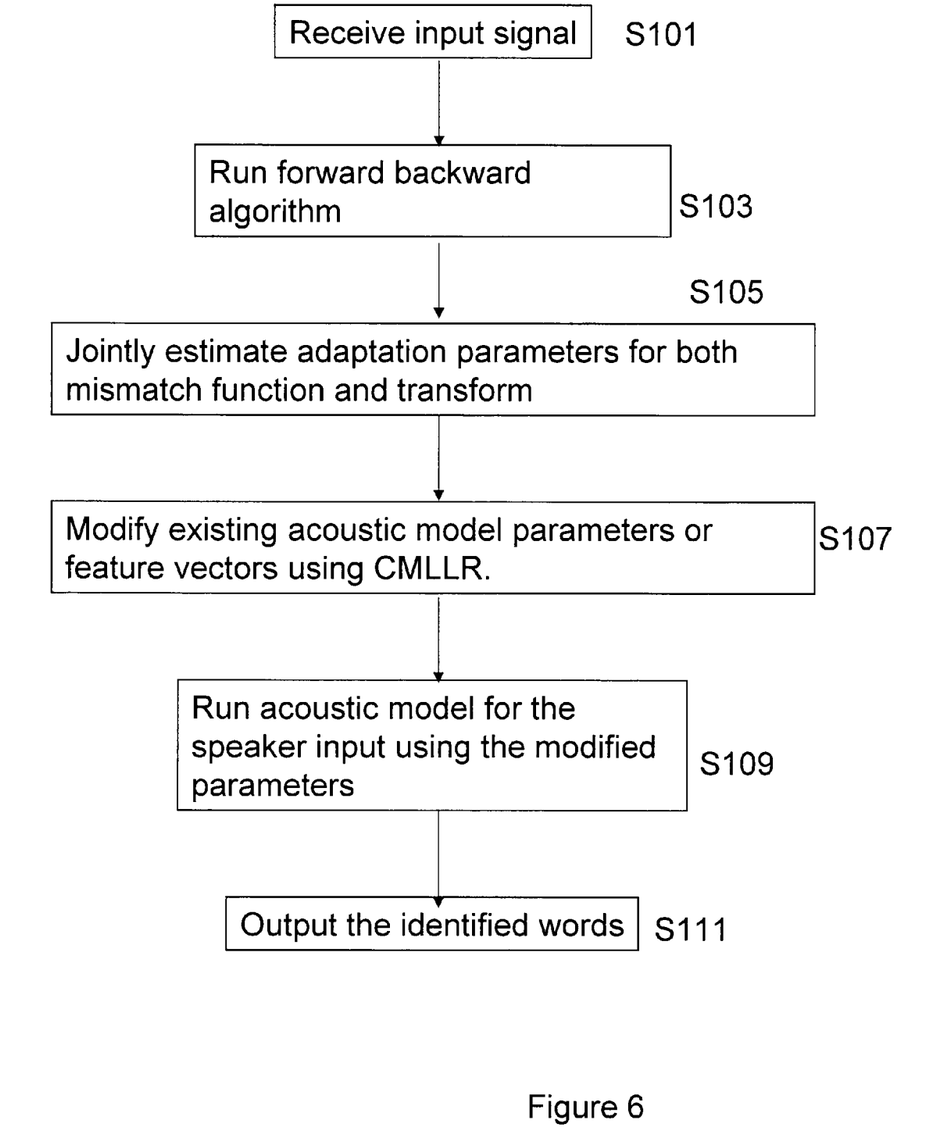
FIG. 6 is a flow diagram showing a speech processing method in accordance with an embodiment of the present invention.

FIG. 6 is a flow diagram showing a speech recognition method in accordance with an embodiment of the present invention. Speech is input in step S101. In most embodiments, the input speech will not correspond to a known transcription. However, a transcription can be estimated which corresponds to the speech. Typically, this will be done by performing a first pass of the decoder to obtain a first estimate. Possible operations will be described after step S111.

The forward/backward algorithm is then run in step S103. From the input data, adaptation parameters are estimated for both the mismatch function and the transform at the same time in S105. In one embodiment where VTLN and VTS are used, the expectation maximisation algorithm is run on the auxiliary function of equation 16 to optimise jointly $\Lambda_{ns}=(\mu_{ns},\mu_{hs},\Sigma_n,A^{(r)},b^{(r)})$.

The acoustic model parameters of the speech recognition systems are then directly transformed using the transform of step S105 or the feature vectors are transformed using CMLLR in step S107 to match the acoustic model.

A speech recognition system will also comprise a language model in addition to an acoustic model. A language model is used to indicate the probability that the sequences of words output by an acoustic model occur in a given language. The probabilities for various sequences are scored both by the acoustic model and the language model and the probabilities are combined.

In one embodiment, recognition is run with the acoustic model and unchanged language model for the new speaker using the modified parameters in step S109 and the identified words are output in step S111. Recognition with the adapted acoustic model can take one of two forms:
(1) standard ASR—needs acoustic model and language model to determine possible recognition hypotheses—this could be a $2^{nd}$ pass on the same data or using the new acoustic model on the next speech input;
(2) rescoring—a lattice or N-best list of possible hypotheses from the $1^{st}$ recognition pass used to determine the text in the $1^{st}$ estimate is saved, The language model scores are saved with the lattice/N-best list. Then full recognition does not need to be run. Only acoustic model scores are required at each frame which are combined with the stored language model scores to "rescore" the saved lattice paths. Rescoring would only apply if rerunning on same data.

For complex recognition tasks, it is much faster to rescore than run a whole recognition pass from scratch.

In the above embodiment, a first pass decoding run is performed to obtain an initial transcription. Any model can be used for the first-pass decoding, but often the baseline (speaker independent) model is used. With an initial transcription and corresponding data, a transform can be estimated for adaptation. This transform can then either be used to redecode the current data (i.e. that used to estimate the transform) and improve the initial hypothesis. Or, the transform can be used on other test data.

In use, the user is likely not to be aware that adaptation was ongoing. The user would only perceive recognition as taking place.

The adaptation parameters may be continually re-estimated or there may be an adaptation training phase where new transforms are estimated.

In general, there will be some continual re-estimation of adaptation parameters, which is especially useful when there are multiple users/noises etc. There follows three different scenarios which might take place:

EXAMPLE 1

Incremental Mode a. user1 makes a request "play let it be"
b. system incorrectly recognises and outputs "play you and me" (user1 unhappy)
c. system then obtains transform using hypothesis "play you and me"
d. user1 makes a second request "play the beatles"
e. system uses transform to decode and output hypothesis "play the beatles" (user1 happy)
f. system uses second utterance to improve transform . . . etc.

EXAMPLE 2

Similar but Redecoding a. user1 makes a request "play let it be"
b. system incorrectly recognises "play you and me"
c. system then obtains transform using hypothesis "play you and me"
d. system uses transform to redecode original data and outputs new hypothesis "play let it be" (user1 happy)
e. user1 makes a request "play the zutons"
f. system uses first transform to decode "play the zutons"
g. system uses second utterance to improve first transform
h. system redecodes second utterance using improved transform . . . etc.

EXAMPLE 3

Redecoding but Multiple Users a. user1 makes a request "play let it be"
b. system incorrectly recognises "play you and me"
c. system then obtains transform using hypothesis "play you and me"
d. system uses transform to redecode original data and outputs new hypothesis "play let it be" (user1 happy)
e. user2 makes a request "play the zutons"
f. system uses original model to decode "play the beatles"
g. system estimates user2 transform using "play the beatles"
h. system redecodes second utterance using user2 to get new hypothesis "play the zutons" (user2 also happy)

In the above, the system may also receive user feedback, such that the system does not use a hypothesis which the user has indicated is incorrect to re-estimate transforms.

To demonstrate the above, experiments were performed on the Aurora 2 database of connected digits and Toshiba in-car tasks which will be explained below.

Aurora 2 is divided into two training sets (clean and multi-condition) and three noisy test sets. Test set A and B respectively include four types of additive noise with SNR ranging from 20 to 0 dB while set C also contains convolutional noise. Each digit was modelled by 16 HMM states with three mixtures whereas the silence was modelled by 3 states each with 6 mixtures—546 mixtures in all.

Toshiba data was mainly used in this paper for evaluating adaptive training techniques in real recorded car-driving conditions. It contains four tasks, phone number (PH), digits (4D), command control (CC) and city names (CN) each recorded in two noise conditions i.e. engine-on (EN) and highway (HW). The ENON condition contains 4401 utterances and has an average SNR 35 dB, whereas the HW condition contains 4582 sentences with SNR around 18 dB. A triphone HMM with 650 states was trained on a mixed multi-condition set including 312 hours of data consisting of Wall Street Journal, TIDIGITS, TIMIT and internally collected noisy training data. There were 12 mixtures for each speech state in the HMM and 24 mixtures

TABLE I

WER (%) VVTS RESULTS ON AURORA 2 WITH CLEAN HMM

| SNR (dB) | VTS | VTS + VTLN | VVTS |
|---|---|---|---|
| 20 | 1.68 | 1.60 | 1.51 |
| 15 | 2.32 | 2.24 | 2.13 |
| 10 | 4.36 | 4.29 | 4.05 |
| 5 | 11.04 | 10.98 | 10.40 |
| 0 | 29.71 | 29.83 | 29.07 |
| Ave | 9.82 | 9.79 | 9.43 |

TABLE II

WER (%) VVTS RESULTS ON AURORA 2 WITH CLEAN HMM

| SNR (dB) | PCMLLR | PCMLLR + VTLN | VVTS + PCMLLR |
|---|---|---|---|
| 20 | 1.63 | 1.60 | 1.47 |
| 15 | 2.43 | 2.32 | 1.98 |
| 10 | 4.14 | 4.02 | 3.66 |
| 5 | 10.37 | 10.03 | 9.41 |
| 0 | 27.19 | 26.82 | 26.20 |
| Ave | 9.15 | 8.96 | 8.54 |

TABLE III

WER (%) VVTS RESULTS ON AURORA 2 WITH CLEAN HMM

|  | Set A | Set B | Set C | Ave |
|---|---|---|---|---|
| VTS | 9.82 | 9.06 | 9.28 | 9.41 |
| VTS + VTLN | 9.79 | 9.03 | 9.25 | 9.38 |
| VVTS | 9.43 | 8.81 | 9.01 | 9.10 |
| PCMLLR | 9.15 | 8.64 | 9.40 | 9.00 |
| PCMLLR + VTLN | 8.96 | 8.45 | 9.29 | 8.82 |
| VVTS + PCMLLR | 8.54 | 8.06 | 8.81 | 8.40 |

TABLE IV

WER (%) FOR TOSHIBA DATA

| Method | EN | | | | | HW | | | | | Avg | |
|---|---|---|---|---|---|---|---|---|---|---|---|---|
| | PH | 4D | CC | CN | Avg | PH | 4D | CC | CN | Avg | WER | SER |
| MFCC | 0.90 | 0.61 | 1.05 | 4.11 | 1.10 | 2.91 | 2.41 | 1.95 | 14.57 | 2.99 | 2.07 | 8.09 |
| +PAT | 0.60 | 0.29 | 0.72 | 3.86 | 0.79 | 1.37 | 1.22 | 1.29 | 8.74 | 1.68 | 1.25 | 5.20 |
| +MPE | 0.32 | 0.14 | 0.43 | 2.14 | 0.44 | 1.17 | 0.70 | 0.92 | 7.46 | 1.31 | 0.89 | 3.73 |
| +GD | 0.32 | 0.11 | 0.38 | 2.06 | 0.41 | 0.95 | 0.61 | 0.85 | 6.43 | 1.13 | 0.78 | 3.33 |
| VVPAT | 0.44 | 0.22 | 0.65 | 3.86 | 0.69 | 1.13 | 0.88 | 1.07 | 9.17 | 1.47 | 1.09 | 4.53 |
| +MPE | 0.25 | 0.11 | 0.40 | 2.83 | 0.44 | 0.74 | 0.58 | 0.84 | 7.54 | 1.10 | 0.78 | 3.16 | for each silence state, giving the overall number of mixtures in the HMM around 8000.

The front-end for VTS based techniques is a 13-dimensional MFCC generated by HTK including the zeroth coefficient with their delta and delta-delta components. As a comparison, results for one of the most powerful front-end processing techniques in the literature, advanced front-end (AFE) were also included here as a baseline.

For VTS-based technique, a two-pass decoding procedure was employed for each test utterance. Specifically,
1) Use the first and last 20 frames in each utterance to obtain a rough estimation of the noise and compensate the HMM
2) Run decoding to get the initial hypothesis
3) Refine the noise (or noise and speaker) estimation based on the hypothesis using EM
4) Compensate HMM with the noise estimates and output final recognition result Experimental results were given in Table I where clean training was employed and test was only on set A. Clear gain was observed from model based VTS compared to the AFE. Further applying VTLN after VTS model compensation only brought very small (or no) gains. This is reasonable as the model after being compensated by VTS becomes noisy which models the noisy speech distribution. As VTLN was originally invented for speaker adaptation in clean feature space, further applying VTLN after VTS violates its basic assumption. By embedding VTLN transform as part of the mismatch function and jointly optimising them, VVTS yields much larger and very consistent improvement. This justifies our discussion that applying VTLN in clean space and jointly optimising VTLN and noise parameters are important. Also it was noticed that the gain on higher SNRs is larger than on lower SNRs indicating speaker compensation is more important on less noisy cases.

TABLE V

WER (%) ON AURORA 2 WITH MULTI-CONDITIONAL TRAINING DATA

| Set | MTR | AFE | PAT | VVPAT |
|---|---|---|---|---|
| A | 13.53 | 8.22 | 7.27 | 6.97 |
| B | 14.15 | 8.90 | 7.10 | 6.72 |
| C | 16.38 | 9.42 | 7.67 | 7.18 |
| Ave | 14.35 | 8.73 | 7.28 | 6.91 |

Table I also compared the results for PCMLLR, VVTS based PCMLLR and VTLN after PCMLLR. Similar conclusions and observations can be obtained as before. This proves VVTS is a consistent method, and the newly proposed mismatch function is generic and can work properly with different methods.

VVPAT results were given in Table V, where MTR data is used for HMM training and results on all the three sets were summarised. Compared to PAT, consistent gain was observed from VVPAT for all the test sets indicating applying VVTS based PCMLLR during training yields a better canonical model. Further results for adaptive training were also provided on Toshiba data, and observations were consistent with those on Aurora 2. Here, MPE adaptive training was also employed after the PAT or VVPAT to further boost the performance. VVPAT together with MPE can match the best PAT performance even without using GD. This does bring further benefits as only one gender-independent HMM is required.

While certain embodiments have been described, these embodiments have been presented by way of example only, and are not intended to limit the scope of the inventions. Indeed the novel methods and systems described herein may be embodied in a variety of other forms; furthermore, various omissions, substitutions and changes in the form of methods and systems described herein may be made without departing from the spirit of the inventions. The accompanying claims and their equivalents are intended to cover such forms of modifications as would fall within the scope and spirit of the inventions.

The invention claimed is:

1. A speech processing method, comprising: receiving a speech input which comprises a sequence of feature vectors;
   determining a likelihood of a sequence of words arising from the sequence of feature vectors using an acoustic model and a language model, comprising:
   providing an acoustic model for performing speech recognition on an input signal which comprises a sequence of feature vectors, said model having a plurality of model parameters relating to the probability distribution of a word or part thereof being related to a feature vector, wherein said speech input is a mismatched speech input which is received from a speaker in an environment which is not matched to the speaker or environment under which the acoustic model was trained; and
   adapting the acoustic model to the mismatched speech input,
   the speech processing method further comprising determining a likelihood of a sequence of features occurring in a given language using a language model; and
   combining the likelihoods determined by the acoustic model and the language model and outputting a sequence of words identified from said speech input signal,
   wherein adapting the acoustic model to the mismatched speaker input comprises:
   relating speech from the mismatched speaker input to the speech used to train the acoustic model using: a mismatch function f for primarily modeling differences between the environment of the speaker and the environment under which the acoustic model was trained;
and a speaker transform F for primarily modeling differences between the speaker of the mismatched speaker input, such that:

$$y=f(F(x,v),u)$$

where y represents the speech from the mismatched speaker input, x is the speech used to train the acoustic model, u represents at least one parameter for modeling changes in the environment and v represents at least one parameter used for mapping differences between speakers; and jointly estimating u and v,
wherein said joint estimation of u and v is performed using the expectation maximization algorithm and comprises optimizing u and v in a single maximization step of said algorithm,
wherein said at least one parameter u comprises parameters n and h, where n is used to model additive noise and h is used to model convolutional noise, and
wherein said mismatch function f is of the form:

$$y_s = q(x_s, n_s, h_s)$$
$$= F(x_s) + h_s + C ln\left(1 + e^{C^{-1}(n_s - F(x_s) - h_s)}\right)$$

where C the discrete cosine transformation matrix and the subscript s denotes static part.

2. The method according to claim 1, wherein said speaker transform is a linear transform.

3. The method according to claim 2, wherein said speaker transform is a vocal tract length normalisation transform.

4. The method according to claim 3, wherein at least one speaker transform parameter is a discrete parameter.

5. The method according to claim 1, wherein adapting the acoustic model further comprising using PCMLLR with the CMLLR form:

$$p(y|m)=|A_c^{(r)}|N(A_c^{(r)}y+b_c^{(r)};\mu_x^{(m)},\Sigma_x^{(m)})$$

where m denotes the $m^{th}$ mixture in a Gaussian distribution of a Hidden Markov Model with mean $\mu_x^{(m)}$ and variance $\Sigma_x^{(m)}$, $A_c^{(r)}$ and $b_c^{(r)}$ are CMLLR transforms to be estimated using PCMLLR techniques which minimises the divergence between the CMLLR form and a target distribution, said target distribution being derived from y=f(F(x, v), u).

6. The method according to claim 1, wherein the adaptation is provided in an adaptive training framework.

7. The method according to claim 1, wherein adapting the acoustic model to the mismatched speaker input comprises receiving speech from the mismatched speaker input corresponding to known text.

8. The method according to claim 1, wherein adapting the acoustic model to the mismatched speaker input comprises receiving speech from said new speaker and making a first estimate of the text corresponding to said speech.

9. A method of adapting an acoustic model for speech processing to a mismatched speech input, said mismatched speech input being received from a speaker in an environment which is not matched to the speaker or environment under which the acoustic model was trained, the method comprising:

receiving a mismatched speech input which comprises a sequence of feature vectors; and
providing an acoustic model for performing speech processing on an input signal which comprises a sequence of feature vectors, said model having a plurality of model parameters relating to the probability distribution of a word or part thereof being related to a feature vector,
wherein adapting the acoustic model to the mismatched speaker input comprises: relating speech from mismatched speaker input to the speech used to train the acoustic model using: a mismatch function f for primarily modeling differences between the environment of the speaker and the environment under which the acoustic model was trained; and a speaker transform F for primarily modeling differences between the speaker of the mismatched speaker input, such that:

$$y=f(F(x,v),u)$$

where y represents the speech from the mismatched speaker input, x is the speech used to train the acoustic model, u represents at least one parameter for modeling changes in the environment and v represents at least one parameter used for mapping differences between speakers; and jointly estimating u and v,
wherein said joint estimation of u and v is performed using the expectation maximization algorithm and comprises optimizing u and v in a single maximization step of said algorithm,
wherein said at least one parameter u comprises parameters n and h, where n is used to model additive noise and h is used to model convolutional noise, and
wherein said mismatch function f is of the form:

$$y_s = q(x_s, n_s, h_s)$$
$$= F(x_s) + h_s + C ln\left(1 + e^{C^{-1}(n_s - F(x_s) - h_s)}\right)$$

where C the discrete cosine transformation matrix and the subscript s denotes static part.

10. A non-transitory carrier medium carrying computer readable instructions for controlling the computer to carry out the method of claim 1.

11. A speech processing system, comprising:
a receiver for receiving a speech input which comprises a sequence of feature vectors; and
a processor configured to:
determine a likelihood of a sequence of words arising from the sequence of feature vectors using an acoustic model and a language model, comprising:
provide an acoustic model for performing speech recognition on an input signal which comprises a sequence of feature vectors, said model having a plurality of model parameters relating to the probability distribution of a word or part thereof being related to a feature vector, wherein said speech input is a mismatched speech input which is received from a speaker in an environment which is not matched to the speaker or environment under which the acoustic model was trained; and
adapt the acoustic model to the mismatched speech input, the processor being further configured to determine a likelihood of a sequence of features occurring in a given language using a language model; and
combine the likelihoods determined by the acoustic model and the language model, the system further comprising an output configured to output a sequence of words identified from said speech input signal, wherein adapting the acoustic model to the mismatched speaker input comprises:

relating speech from mismatched speaker input to the speech used to train the acoustic model using: a mismatch function f for primarily modeling differences between the environment of the speaker and the environment under which the acoustic model was trained; and a speaker transform F for primarily modeling differences between the speaker of the mismatched speaker input, such that:

$$y=f(F(x,v),u)$$

where y represents the speech from the mismatched speaker input, x is the speech used to train the acoustic model, u represents at least one parameter for modeling changes in the environment and v represents at least one parameter used for mapping differences between speakers; and jointly estimating u and v, wherein said joint estimation of u and v is performed using the expectation maximization algorithm and comprises optimizing u and v in a single maximization step of said algorithm, wherein said at least one parameter u comprises parameters n and h, where n is used to model additive noise and h is used to model convolutional noise, and wherein said mismatch function f is of the form:

$$y_s = q(x_s, n_s, h_s)$$
$$= F(x_s) + h_s + C ln\left(1 + e^{C^{-1}(n_s - F(x_s) - h_s)}\right)$$

where C the discrete cosine transformation matrix and the subscript s denotes static part.

* * * * *